United States Patent
Spanos et al.

(10) Patent No.: US 8,826,520 B1
(45) Date of Patent: Sep. 9, 2014

(54) APPARATUS FOR EXTRACTING A ROTOR FROM A GENERATOR

(75) Inventors: Charles Vaughan Spanos, Mauldin, SC (US); Charles Van Buchan, Greer, SC (US); James Bradford Holmes, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/558,398

(22) Filed: Jul. 26, 2012

(51) Int. Cl.
  *B23P 19/00* (2006.01)
(52) U.S. Cl.
  USPC .................................. 29/732; 29/596; 29/598
(58) Field of Classification Search
  USPC .......... 29/732–736, 596–598; 254/89 R, 134, 254/134.3 R
  See application file for complete search history.

(56) References Cited

U.S. PATENT DOCUMENTS

| | | | | |
|---|---|---|---|---|
| 4,330,105 A | * | 5/1982 | Gallagher | .................... 254/89 R |
| 4,451,979 A | * | 6/1984 | Schuster | ......................... 29/824 |
| 4,532,689 A | * | 8/1985 | Harder et al. | ................. 29/426.5 |
| 4,533,127 A | * | 8/1985 | Hawkins | .......................... 269/17 |
| 5,934,490 A | * | 8/1999 | Mora | ............................. 212/176 |
| 6,510,803 B1 | * | 1/2003 | Agee | .............................. 108/147 |
| 6,682,030 B2 | * | 1/2004 | Santoro et al. | ............. 248/188.5 |
| 7,484,290 B2 | * | 2/2009 | Henley | ............................. 29/598 |
| 7,871,064 B2 | | 1/2011 | Dailey et al. | |
| 8,276,526 B2 | * | 10/2012 | Verweij | ......................... 108/147 |
| 2007/0269608 A1 | | 11/2007 | Saito et al. | |

\* cited by examiner

*Primary Examiner* — Minh Trinh

(74) *Attorney, Agent, or Firm* — Hiscock & Barclay LLP

(57) ABSTRACT

This disclosure describes embodiments of an apparatus for use to extract a rotor from a generator. The apparatus can include a central mount element that secures to the end of the rotor. A pair of support members coupled to the sides of the central mount element. The support members can include a load bearing element that permits travel of the apparatus on a surface, e.g., a platform proximate to the turbine generator. During implementation, the apparatus is configured to direct pulling forces along the center axis of the rotor to restrict movement of the rotor and, in particular, limit rotation of the rotor that can result in inadvertent contact with the stator or other parts of the generator.

20 Claims, 8 Drawing Sheets

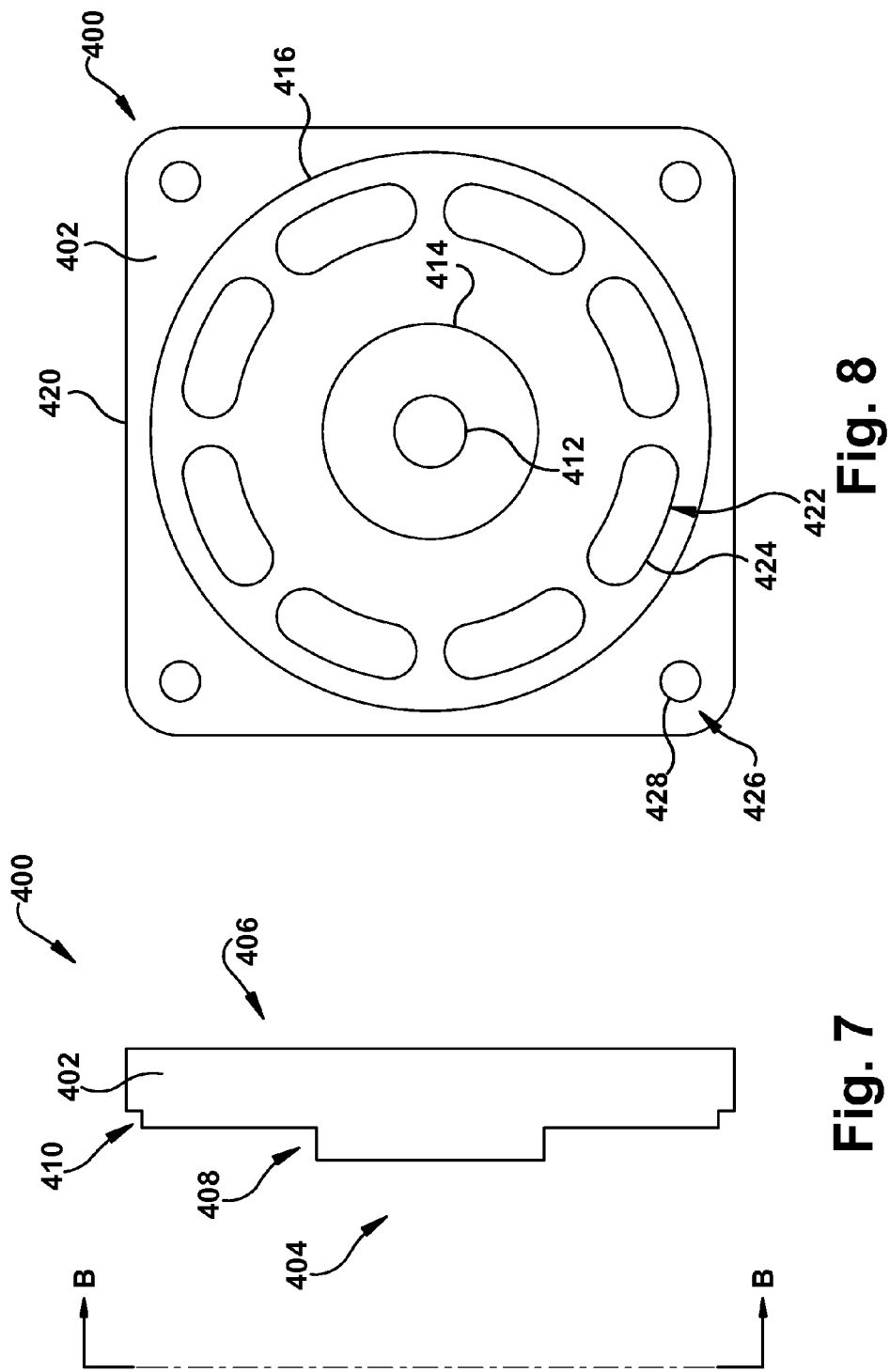

APPARATUS FOR EXTRACTING A ROTOR FROM A GENERATOR

BACKGROUND OF THE INVENTION

The subject matter disclosed herein relates to generators and repair of the same and, in particular, to an apparatus that restricts movement of a rotor (or "field generator") during extraction of the rotor, e.g., from a gas turbine generator.

Generators include a stator and a rotor that rotates relative to the stator to generate electricity. Technicians often need to extract the rotor from the stator to perform repair and maintenance on the generator. In conventional practice, this task requires overhead cranes and rigging in combination with certain implements (e.g., field support shoes and core skid pans) to guide and support the rotor during extraction from the generator. The configuration of the rigging, however, is not typically standardized, but rather the construction of the generator and the experience and know-how of the technicians that are to complete the repairs and maintenance ultimately determine the way the rigging secures to the rotor.

The rigging often engages the rotor at points that are radially outside of the centerline of the rotor. This engagement directs the pulling forces, which extract the rotor from the stator, off-center from the centerline of the rotor. The resulting offset may cause the rotor to become unstable during extraction and, in some cases, prone to movement (e.g., rolling). Such movement can shift the weight of the rotor off of the field support shoes that are meant to prevent contact between the rotor and the stator or other components of the generator. In some cases, the resulting moment of inertia can cause inadvertent contact between the rotor and the stator, which can lead to extensive damage as well as substantial repair costs and machine downtime.

The discussion above is merely provided for general background information and is not intended to be used as an aid in determining the scope of the claimed subject matter.

BRIEF DESCRIPTION OF THE INVENTION

This disclosure describes embodiments of an apparatus for use to extract the rotor from a generator that restricts movement of the rotor during extraction across a wide range of configurations and installations of generators. The apparatus can include a central mount element that secures to the end of the rotor. A pair of support members coupled to the sides of the central mount element. The support members can include a load bearing element that permits travel on a surface, e.g., a platform proximate to the generator. An advantage that practice of one or more embodiments of the present disclosure is to direct forces along the centerline of the rotor to facilitate straight and level travel of the rotor during extraction.

The present disclosure describes, in one embodiment, an apparatus for extracting a rotor from a generator. The apparatus comprises a central mount element comprising a center pull plate with a center axis and a force coupler for receiving a load. The force coupler secures to the center pull plate and aligns with the center axis. The apparatus also comprises a first support member and a second support member coupled to, respectively, a first side and a second side of the central mount element. The first support member and the second support member have a top end and a bottom end, wherein the center pull plate is located proximate to the top end when secured to the rotor. The apparatus further comprises load bearing elements disposed on the bottom ends of the first support member and the second support member.

The present disclosure also describes, in one embodiment, an apparatus for extracting a rotor from a generator. The apparatus comprises a center pull plate that comprises a first plate and a second plate that couples with the first plate. The apparatus also comprises a pair of support members coupled to the center pull plate, one support member on a first side of the center pull plate and one support member on a second side of the center pull plate. The support members comprise vertical upright elements that have a top end and a bottom end and an adapter element that translates vertically on the vertical upright element. The apparatus further comprises a plurality of rolling elements disposed on the bottom ends of the vertical upright elements.

The present disclosure further describes, in one embodiment, an apparatus for extracting a rotor from a generator. The apparatus comprises a welded frame with a first side and a second side. The welded frame comprises a plurality of frame members and a plate with a center axis disposed on the centerline. The apparatus further comprises a first support member and a second support member slidably engaging at least one of the frame members. The first support member and the second support member are located, respectively, on the first side and the second side of the welded frame. The apparatus further comprises load bearing elements disposed on bottom ends of the first support member and the second support member.

This brief description of the invention is intended only to provide a brief overview of the subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 7 depicts a side view of an adapter plate for use in an apparatus for removing a rotor from a generator, e.g., the apparatus of FIGS. 5 and 6;

FIG. 8 depicts a front view of the adapter plate of FIG. 7; and

DETAILED DESCRIPTION OF THE INVENTION

Broadly, the discussion below focuses on embodiments of an apparatus that secures to an end of a rotor found in a generator (e.g., a turbine generator). When in position, the apparatus directs forces (e.g., pulling forces) along the centerline of the rotor. These forces move the rotor during repair and maintenance of the generator. Configurations of the apparatus, however, eliminate the need for extensive rigging and other implements that couple the rotor to an overhead gantry and/or crane system. As discussed more below, for example, designs for the apparatus maintain the orientation of the rotor during extraction to promote straight and level travel of the rotor and, effectively, reduce the likelihood of movement (e.g., rolling) of the rotor in response to changes in moment of inertia during extraction.

Figure 1:
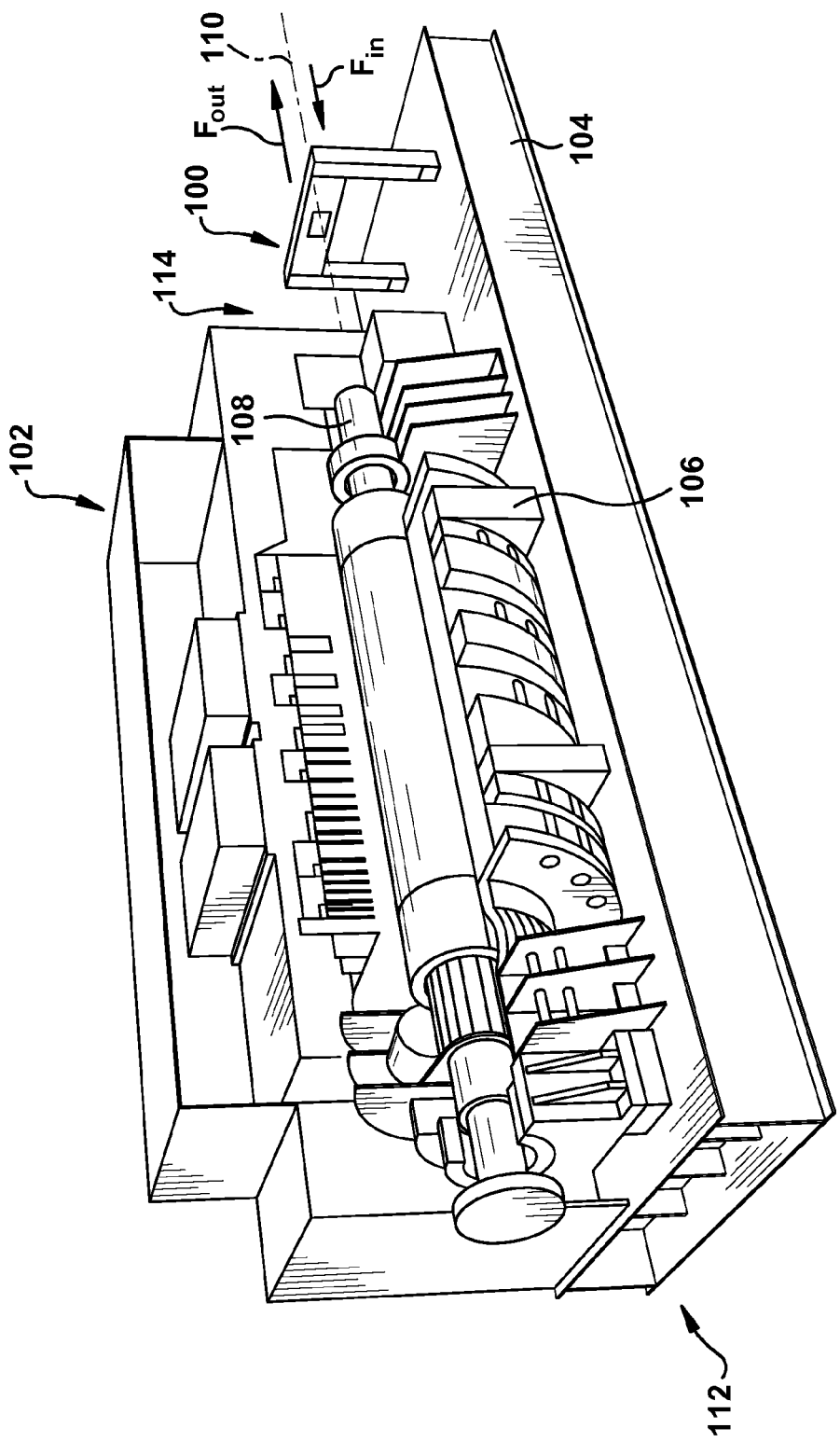
FIG. 1 depicts a perspective view of an exemplary embodiment of an apparatus for removing a rotor from a generator.

FIG. 1 illustrates an exemplary embodiment of an apparatus 100 in position next to a generator 102. The apparatus 100 resides on a structural platform 104 that abuts the generator 102. In one example, the generator 102 has a stator 106 and a rotor 108 with a rotor axis 110. The rotor 108 has a driver end 112 and a collector end 114. On the driver end 112, the rotor 108 can mate with a gas or steam turbine and/or other power generating equipment that rotates the rotor 108 relative to the stator 106.

During repair and/or maintenance, technicians can secure the apparatus 100 to the rotor 108 proximate to the collector end 114. Examples of the apparatus 100 transmit a force (e.g., a pulling force $F_{IN}$ and/or a pushing force $F_{OUT}$) to the rotor 108 along the rotor axis 110. The forces $F_{IN}$ and $F_{OUT}$ change the position of the rotor 108 in relation to the stator 106. For example, application of the force F as a pulling force $F_{OUT}$ can extract the rotor 108 from the stator 106 to expose portions of the generator 102 for technicians to perform repair and maintenance tasks. After the requisite tasks are complete, application of the force F as a pushing force $F_{IN}$ returns the rotor 108 back into position inside of the stator 106.

Figure 2:
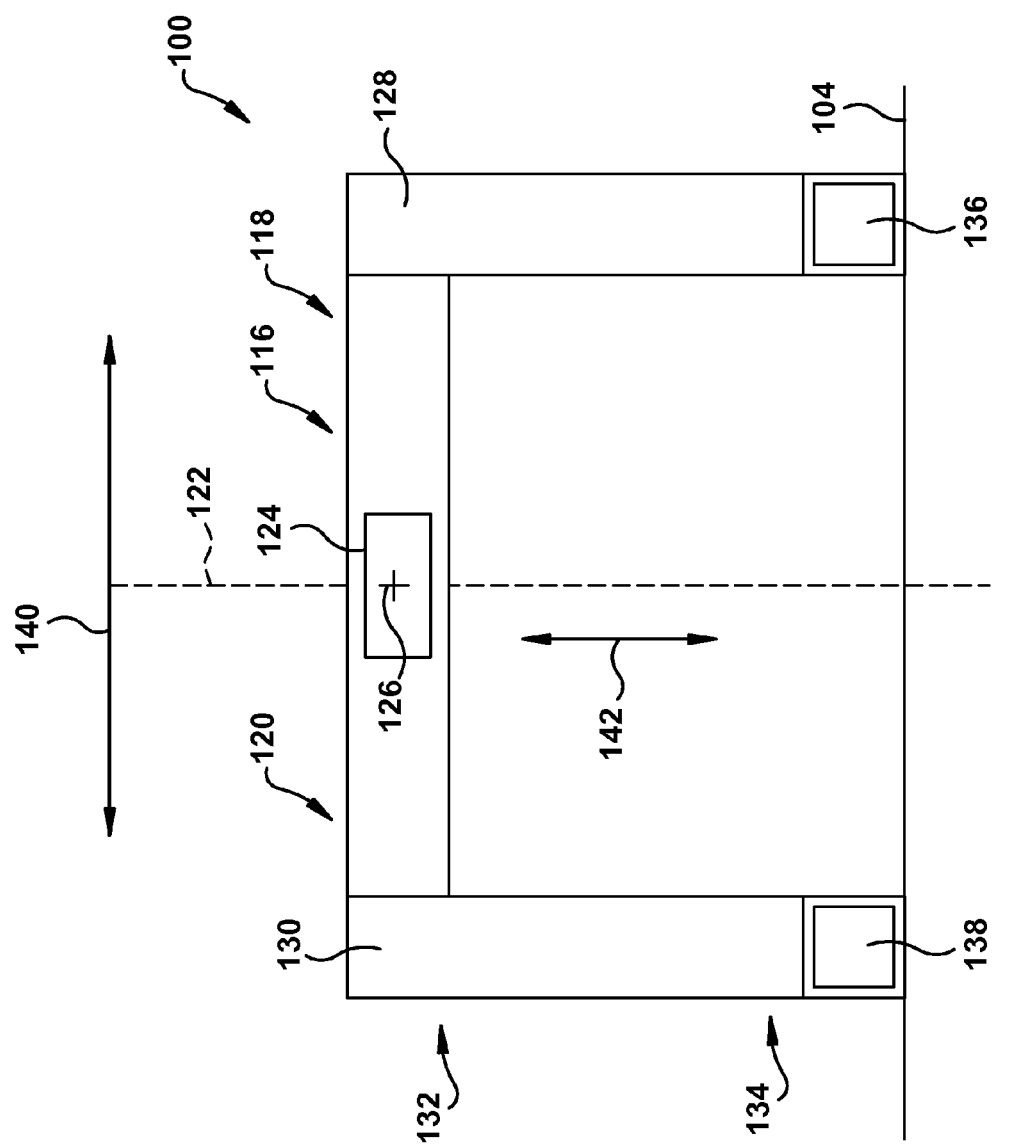
FIG. 2 depicts a front view of the apparatus of FIG. 1.

FIG. 2 illustrates a front view of the exemplary apparatus 100. In the example of FIG. 2, the apparatus 100 has a central mount element 116 with a first side 118, a second side 120, and a center line 122 disposed therebetween. The central mount element 116 supports a rotor mount 124 with a center axis 126. The apparatus 100 also has a plurality of support members (e.g., a first support member 128 and a second support member 130) on the first side 118 and the second side 120 of the central mount element 116. The support members 128, 130 have a top end 132 and a bottom end 134 and are spaced apart from the center line 122. The support members 128, 130 include load bearing elements (e.g., a first load bearing element 136 and a second load bearing element 138). Examples of the load bearing elements 136, 138 incorporate devices (e.g., castors, wheels, sliders, bearings, etc.) that support loads and facilitate movement of the apparatus 100, e.g., over surfaces of platform 104.

In one embodiment, the apparatus 100 has a plurality of adjustments (e.g., a first adjustment 140 and a second adjustment 142). The adjustments 140, 142 allow changes to the position of certain elements and members of the apparatus 100. For example, the first adjustment 140 changes the horizontal position of the support members 128, 130 relative to the center line 118. This feature can increase and decrease the spacing of the support members 128, 130 relative to one another, e.g., to fit the apparatus 100 to areas on the support platform 104 and/or to balance loading and prevent rolling of the rotor 108 of FIG. 1. On the other hand, the second adjustment 142 changes the vertical position of the central mount element 116 relative to the structural platform 104. This feature is useful to locate mounting features on the rotor mount 120 with corresponding mounting features on the rotor 108 of FIG. 1.

With reference to both FIGS. 1 and 2, securing of the central mount element 116 to the rotor 108 may utilize fasteners (e.g., bolts) that engage the rotor mount 120 to the rotor 108. Exemplary fasteners can carry loads of magnitude necessary to allow extraction of the rotor 108 from the generator 102. In one example, mounting the rotor mount 120 to the rotor 108 aligns the center axis 126 with the rotor axis 112. This configuration directs pulling forces along the rotor axis 112 to promote straight and level extraction of the rotor 108 from the generator 102.

In one embodiment, technicians can apply the pulling force $F_{OUT}$ directly to the central mount element 116 and, in one particular construction, directly on the rotor mount 124. The central mount element 116 may be equipped, for example, to allow the technicians to couple peripheral equipment to the apparatus 100. Examples of these peripheral devices include winches, pulleys, come-alongs, and like devices that can generate forces sufficient to move the rotor 108 from its position in the generator 102.

Figure 3:
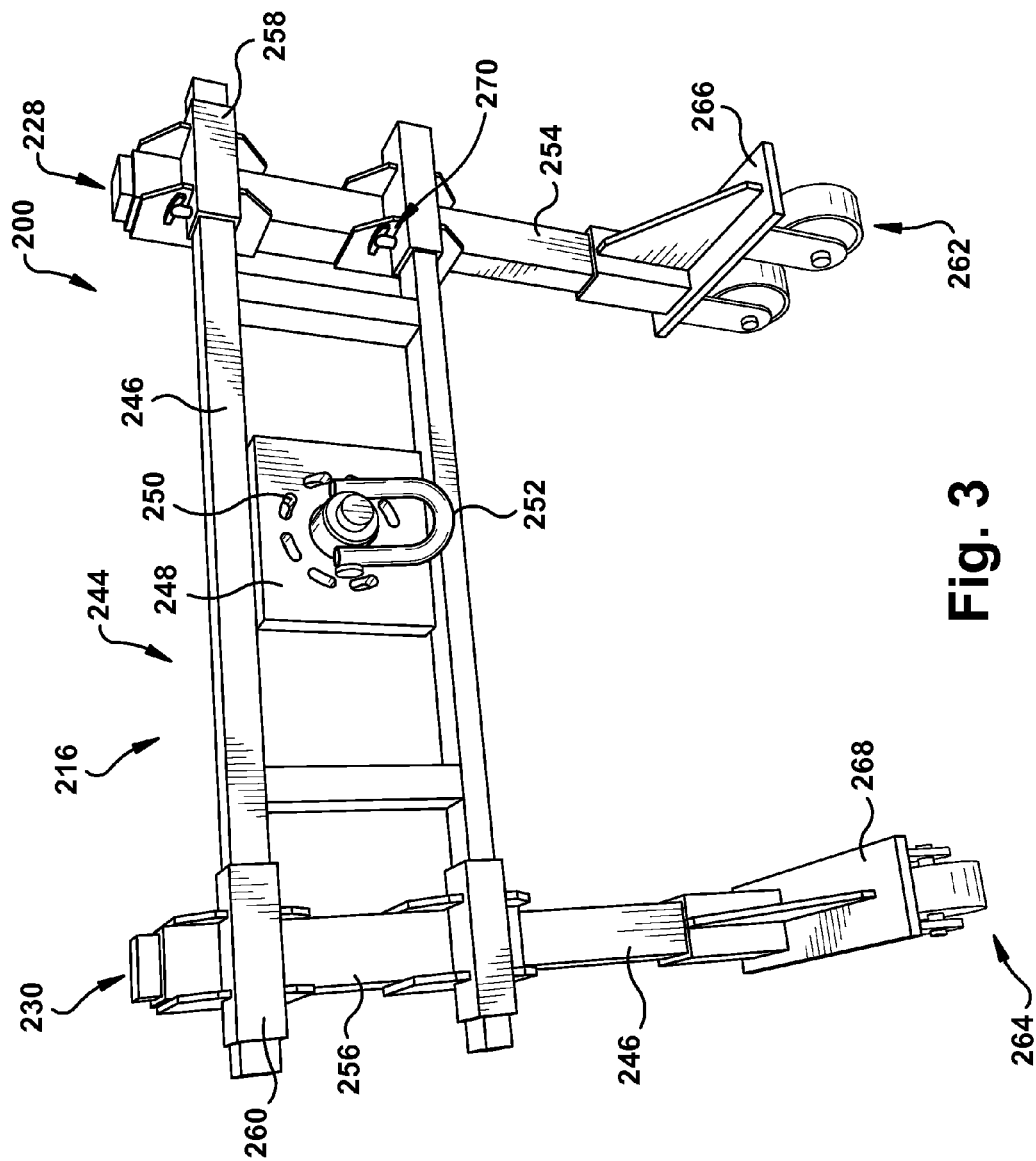
FIG. 3 depicts a perspective view of another exemplary embodiment of an apparatus for removing a rotor from a generator.

FIG. 3 illustrates another exemplary embodiment of an apparatus 200 for removing a rotor from a generator. In FIG. 3, the central mount element 216 includes a frame 244 with one or more frame members 246. The rotor mount 220 includes a center pull plate 248 with a plurality of openings 250 and a force coupler 252 (e.g., a hoist ring, a hitch, etc.). The support members 228, 230 include vertical upright elements (e.g., a first vertical upright element 254 and a second vertical upright element 256) and adapter elements (e.g., a first adapter element 258 and a second adapter element 260). The adapter elements 258, 260 can transit vertically on the vertical upright elements 254, 256 and horizontally on the frame members 246. The load bearing elements 236, 238 have sets of rolling elements (e.g., a first set 262 and a second set 264) disposed on foot elements (e.g., a first foot element 266 and a second foot element 268) that couple proximate to the bottom end 234 of the vertical upright elements 254, 256 on the support members 228, 230.

In one embodiment, the apparatus 200 also includes a plurality of releasable fasteners 270, which couple the elements of the apparatus 200 together. Examples of the releasable fasteners 270 include bolts and screws as well as pull-pins and related "quick-release" devices that can penetrate through openings in multiple elements (e.g., the frame members 246 and the adapter elements 258, 260). This feature of the apparatus 200 facilitates adjustment, e.g., of the horizontal position of the adapter elements 258, 260 on the frame members 246 and the vertical position of the adapter elements 258, 260 on the vertical upright elements 254, 256. For example, the frame members 246 may include frame openings (e.g., holes) at locations spaced apart a defined increments relative to center pull plate 248 (or centerline 118 of FIG. 2). The position of the adapter elements 258, 260 can be changed relative to the center pull plate 248 by aligning openings (e.g., holes) on the adapter elements 258, 260 with the frame openings and inserting the releasable fasteners 270.

Moreover, use of releasable fasteners 270 allows construction of the apparatus 200 as a plurality of piece parts. Such construction alleviates issues with shipping and transport of the apparatus 200 into position at the generator (e.g., generator 102 of FIG. 1). For example, the apparatus 200 can ship in an unassembled form, which has a form factor that is conducive to shipment in one or more boxes, for the technicians to assemble the pieces together on site.

Construction of the apparatus 200 can utilize manufacturing techniques that are known to provide secure connection of elements and meet the desired strength characteristics for equipment of this type. For example, the frame 244, the frame members 246, and the adapter elements 258, 260 can take the form of one or more weldments (e.g., a welded frame) and/or like construction that use welds to secure one or more elements (e.g., the center pull plate 248 and the frame members 246) together. This disclosure contemplates materials that include metal (e.g., steel) tubes and plates of selected dimensions (e.g., thickness) and arrangements deemed appropriate for purposes of carrying loads.

Figure 4:
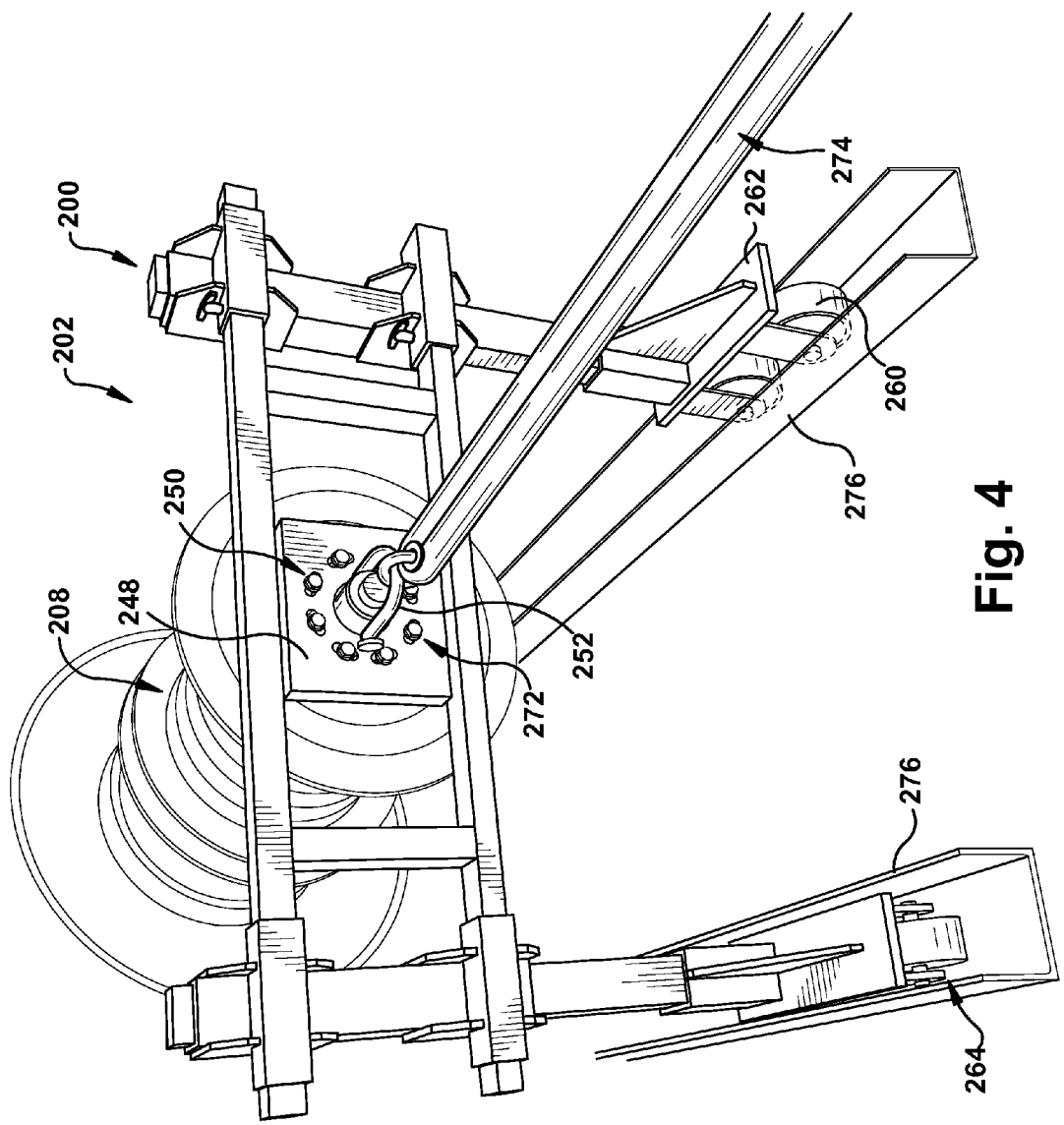
FIG. 4 depicts a perspective view of the apparatus of FIG. 3 in position next to a generator.

FIG. 4 illustrates the apparatus 200 in position on the generator 202. In the example of FIG. 4, the apparatus 200 includes a plurality of fasteners 272, which penetrate the openings 250 to affix the center pull plate 248 with the rotor 208. A peripheral device 274 couples with the force coupler 252. The rolling elements 262, 264 travel in a set of channels 276 that mount to the structural platform 204. Examples of the channels 276 can comprise U-channel steel members and/or I-beams. The structural platform 204 may incorporate the channels 276, e.g., for purposes of carrying an overhead crane that is used during maintenance and repair of the generator 202. In one example, the location of the channels 276 relative to the generator 202 and/or relative to one another may require horizontal adjustment (e.g., first adjustment 140 of FIG. 1) of the adapter elements 258, 260 to position the rolling elements 262, 264 in the channels 272.

Figure 5:
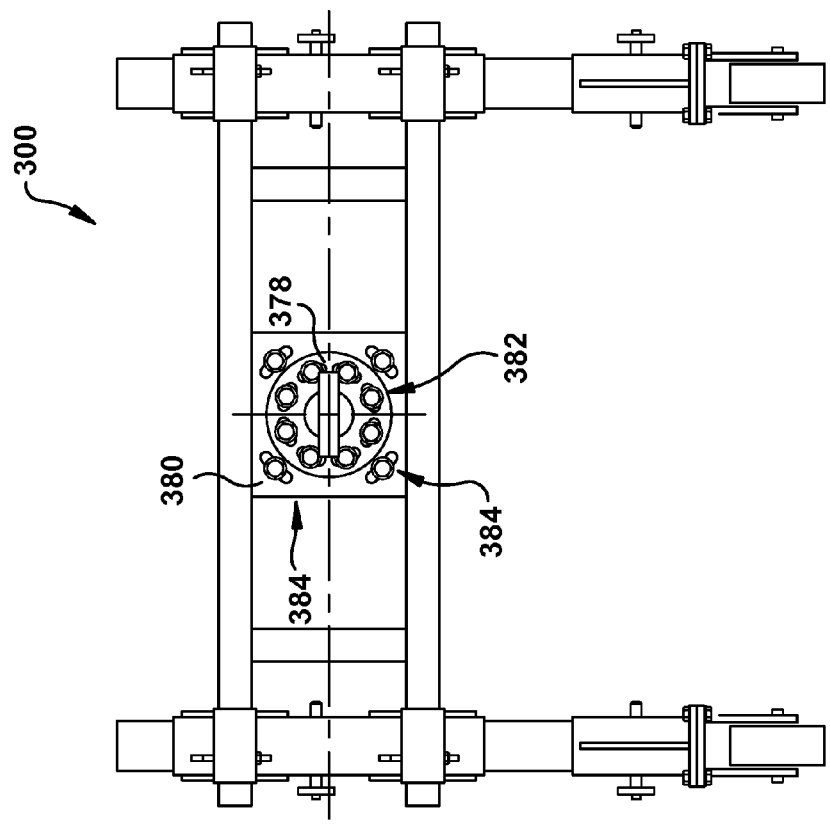
FIG. 5 depicts a front view of yet another exemplary embodiment of an apparatus for removing a rotor from a generator.
Figure 6:
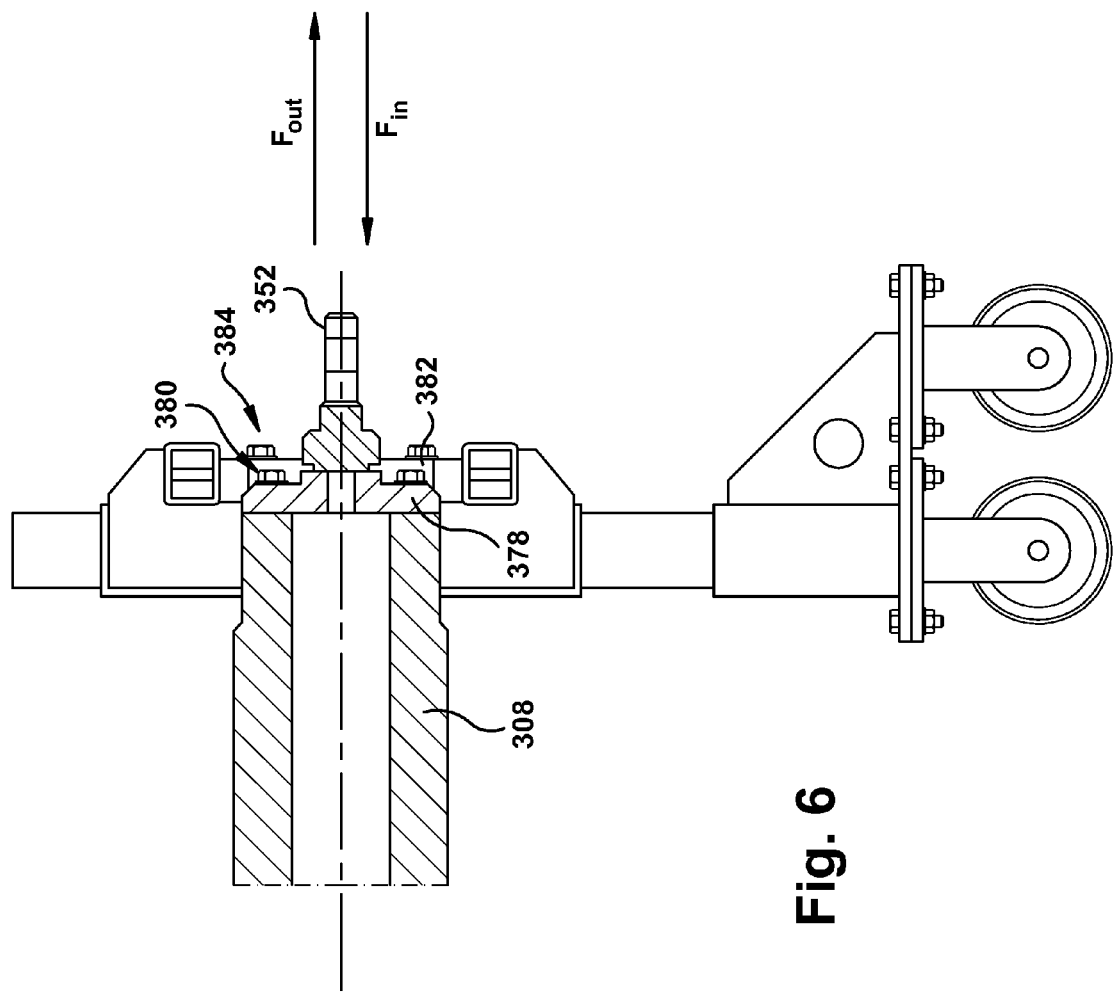
FIG. 6 depicts a side, cross-section view of the apparatus of FIG. 5.

FIGS. 5 and 6 illustrate another exemplary embodiment of an apparatus 300 that can facilitate extraction of a rotor from a generator. FIG. 5 shows a front view of the apparatus 300 in which the center pull plate 348 is split into two separate pieces that includes an adapter plate 378 and a primary plate 380. In one example, the primary plate 380 is itself integrated (e.g., welded) as part of the frame 344. The apparatus 300 utilizes a first set 382 of fasteners (e.g., bolts, screws, etc.) to secure the adapter plate 378 in position on the rotor 308 (FIG. 6). In one example, the apparatus 300 also utilizes a second set 384 of fasteners (e.g., bolts, screws, etc.), which secure the adapter plate 378 to the primary plate 380. This configuration of the center pull plate 348 allows the apparatus 300 to engage the rotor 308 (FIG. 6) independent of the orientation of the rotor 308 (FIG. 6) at the time of repair.

For example, as best shown in the cross-section of FIG. 6, during installation, technicians can first secure the adapter plate 378 using the first set 382 of fasteners onto the exposed end of the rotor 308. Next, technicians can move the apparatus 300 to position the primary plate 380 proximate to the adapter plate 378. Using the second set 384 of fasteners, technicians can secure the adapter plate 378 to the primary plate 380. In the example of FIG. 6, the force coupler 352 threads into the adapter plate 378. Once the apparatus 300 is properly secured to the rotor 308, a force (e.g., a pulling force $F_{OUT}$ and/or a pushing force $F_{IN}$) can be applied to the force coupler 352 and/or the apparatus 300 generally.

FIGS. 7 and 8 depict an example of an adapter plate 400 for use as the adapter plate 378 (FIGS. 5 and 6). As shown in the side view of FIG. 7, the adapter plate 400 includes an adapter body 402 with a first side 404 and a second side 406 that abuts the rotor (e.g., rotor 308 of FIG. 6) when the adapter plate 400 is installed thereon. In one example, the adapter plate 400 includes a stepped profile with an inner step 408 and an outer step 410.

FIG. 8 shows a front view of the adapter plate 400 of FIG. 7. As shown in the front view, the adapter plate 400 has a central threaded aperture 412. The stepped profile takes the form of a pair of annular disc shapes (e.g., a first annular disc 414 and a second annular disc 416) and a square or rectangular shape 420 that forms the second side 406 (FIG. 7). The adapter plate 400 also has a first array 422 of openings 424 that circumscribe the central threaded aperture 412 and a second array 426 of threaded openings 428 that are radially outside the first array 422 as measured from the central threaded aperture 412.

Figure 9:
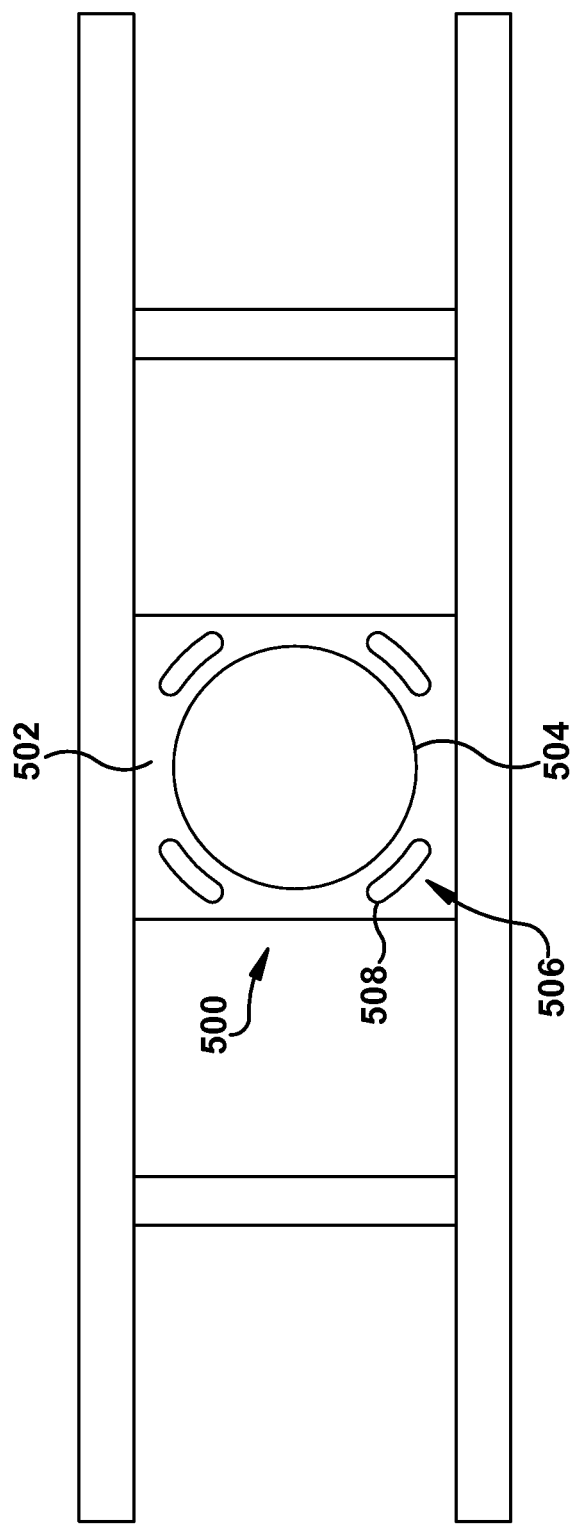
FIG. 9 depicts a front view of a primary plate for use in an apparatus for removing a rotor from a generator, e.g., the apparatus of FIGS. 5 and 6.

FIG. 9 shows an example of a primary plate 500 (e.g., for use as the primary plate 380 of FIGS. 5 and 6). The primary plate 500 includes a plate body 502 and a central opening 504 that extends therethrough. The plate body 502 also includes a third array 506 of openings 508 that circumscribe annularly about the central opening 504.

With reference to the examples of FIGS. 7, 8, and 9, features of the adapter plate 400 and the primary plate 500 allow for appropriate fit and function of these two elements in combination, e.g., to form the center pull plate 348 of FIGS. 5 and 6. In one example, the central opening 504 is sized to receive at least a portion of the adapter plate 400. For example, the diameter of the central opening 504 is larger than the outer diameter of the second annular disc 416. These dimensions allow the outer step 410 of the adapter plate 400 to abut the surface of the primary plate 500. The adapter plate 400 can be secured to the primary plate with fasteners that extend through the primary plate 500 (e.g., through the openings 508 of FIG. 9) and into the adapter plate 400 (e.g., into threaded openings 438 of FIG. 8).

Examples of the openings in the adapter plate 400 and the primary plate 500 include cylindrical holes as well as elongated slots. The cylindrical holes can, as set forth above, include threads of varying characteristics (e.g., pitch) to receive fasteners that secure the adapter plate 400 to the primary plate 500. The elongated slots are useful to accommodate for tolerances, misalignment, and differences in orientation that technicians may encounter during installation of embodiments of the apparatus disclosed herein. By using elongated slots and/or comparably configured features in the adapter plate 400 and the primary plate 500 (and the central pull plate in general), designs for the apparatus (e.g., the apparatus 100, 200, 300 of FIGS. 1, 2, 3, 4, 5, and 6) simplify installation on the rotor and/or generator. The slots provide a larger target opening, as compared to a cylindrical hole. The larger opening accommodates misalignment, which may prevent fasteners from appropriately securing the apparatus to one or more of the rotor, the primary plate 500, and the adapter plate 400.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for extracting a rotor from a generator, said apparatus comprising:
   a central mount element comprising a center pull plate with a center axis and a force coupler for receiving a load, the force coupler securing to the center pull plate and aligning with the center axis;
   a first support member and a second support member coupled to, respectively, a first side and a second side of the central mount element, the first support member and the second support member having a top end and a bottom end, wherein the center pull plate is located proximate to the top end when secured to the rotor; and
   load bearing elements disposed on the bottom ends of the first support member and the second support member,
   wherein the center pull plate comprises an array of openings disposed annularly about the force coupler.

2. The apparatus of claim 1, wherein the openings in the array are spaced radially from one another an amount that matches corresponding bolt openings on the rotor.

3. The apparatus of claim 1, wherein the force coupler comprises a hoist ring.

4. The apparatus of claim 1, further comprising a frame having frame members that integrate the center pull plate.

5. The apparatus of claim 4, further comprising a releasable fastener that secures the first support member and the second support member to the frame members.

6. The apparatus of claim 1, further comprising casters coupled to the load bearing elements.

7. The apparatus of claim 1, wherein the center pull plate is configured to translate in a vertical direction along the first support member and the second support member.

8. The apparatus of claim 1, wherein the first support member and the second support member are configured to translate in a horizontal direction relative to the center pull plate.

9. The apparatus of claim 1, wherein the center pull plate comprises a plurality of separate pieces.

10. An apparatus for extracting a rotor from a generator, said apparatus comprising:
    a central mount element comprising a center pull plate configured to receive fasteners that secure the center pull plate to the rotor, the center pull plate having a center axis and a force coupler for receiving a load, the force coupler securing to the center pull plate and aligning with the center axis;
    a first support member and a second support member coupled to, respectively, a first side and a second side of the central mount element, the first support member and the second support member having a top end and a bottom end, wherein the center pull plate is located proximate to the top end when secured to the rotor; and
    load bearing elements disposed on the bottom ends of the first support member and the second support member,
    wherein the center pull plate comprises a plurality of separate pieces, wherein the plurality of separate pieces comprises an adapter plate and a primary plate, wherein the adapter plate has a stepped profile with an inner step and an outer step, and wherein the primary plate comprises an opening to receive the inner step of the adapter plate.

11. The apparatus of claim 10, wherein the adapter plate has a first array of openings and a second array of openings that are radially outside of the first array of openings.

12. The apparatus of claim 11, wherein the primary plate has a third array of slotted openings.

13. The apparatus of claim 11, wherein the first array are spaced radially from one another an amount that matches corresponding bolt openings on the rotor.

14. The apparatus of claim 10, wherein the force coupler comprises a hoist ring.

15. The apparatus of claim 10, further comprising a frame having frame members that integrate the center pull plate.

16. The apparatus of claim 15, further comprising a releasable fastener that secures the first support member and the second support member to the frame members.

17. The apparatus of claim 16, wherein the releaseable fasteners comprise pull pins that are configured to penetrate through openings in the first support member, the second support member, and the frame members.

18. The apparatus of claim 10, further comprising casters coupled to the load bearing elements.

19. The apparatus of claim 10, wherein the center pull plate is configured to translate in a vertical direction along the first support member and the second support member.

20. The apparatus of claim 10, wherein the first support member and the second support member are configured to translate in a horizontal direction relative to the center pull plate.

* * * * *